(12) United States Patent
Rosenberg et al.

(10) Patent No.: US 10,098,319 B1
(45) Date of Patent: Oct. 16, 2018

(54) PET ACTIVITY MODULE

(71) Applicant: Worldwise, Inc., Novato, CA (US)

(72) Inventors: Hannah Rosenberg, San Francisco, CA (US); Aimee Diskin, Napa, CA (US); Lisa Davis, Fairfax, CA (US); Charles Floyd, Oakland, CA (US)

(73) Assignee: Worldwise, Inc., Novato, CA (US)

( * ) Notice: Subject to any disclaimer, the term of this patent is extended or adjusted under 35 U.S.C. 154(b) by 162 days.

(21) Appl. No.: 15/355,751

(22) Filed: Nov. 18, 2016

(51) Int. Cl.
*A01K 1/00* (2006.01)
*A01K 1/03* (2006.01)
*A01K 15/02* (2006.01)

(52) U.S. Cl.
CPC ............ *A01K 1/033* (2013.01); *A01K 15/024* (2013.01); *A01K 15/025* (2013.01)

(58) Field of Classification Search
CPC ........ A01K 1/00; A01K 1/033; A01K 1/0005; A01K 1/0011; A01K 1/0035; A01K 1/0236
USPC ......................................................... 119/416
See application file for complete search history.

(56) References Cited

U.S. PATENT DOCUMENTS

| | | | | |
|---|---|---|---|---|
| 3,552,356 A * | 1/1971 | Rosenthal | ............ | A01K 15/025 119/28.5 |
| 4,183,323 A * | 1/1980 | Maines | ................ | A01K 13/001 119/416 |
| 4,327,668 A * | 5/1982 | Phillips | ................ | A01K 15/025 119/707 |
| 4,391,223 A * | 7/1983 | Holland | ................ | A01K 1/033 119/499 |
| 5,524,326 A * | 6/1996 | Markowitz | .......... | A01K 15/025 119/482 |
| 5,964,189 A * | 10/1999 | Northrop | ............. | A01K 15/024 119/482 |
| 2002/0100431 A1 * | 8/2002 | Sherman | .............. | A01K 1/0218 119/499 |
| 2003/0136352 A1 * | 7/2003 | Lazarich | .............. | A01K 15/025 119/708 |
| 2006/0057968 A1 * | 3/2006 | Ohtani | .................. | H04L 12/403 455/67.16 |
| 2006/0201437 A1 * | 9/2006 | Ryan | ..................... | A01K 1/0107 119/165 |
| 2007/0039558 A1 * | 2/2007 | Hensley | ............... | A01K 13/004 119/621 |
| 2009/0050072 A1 * | 2/2009 | Moser | .................. | A01K 15/024 119/706 |
| 2009/0250013 A1 * | 10/2009 | Cash | ..................... | A01K 31/04 119/469 |

(Continued)

*Primary Examiner* — Richard T Price, Jr.
(74) *Attorney, Agent, or Firm* — Bay Area Technology Law Group PC

(57) ABSTRACT

A pet activity module having a substantially square or rectangular base for contacting a support surface when in use, substantially parallel back and front walls extending orthogonally from said base and substantially parallel side walls extending orthogonally from the base, the substantially parallel front and back walls being orthogonally joined to the substantially parallel side walls, the base, front, back and side walls together creating an internal volume sized to receive a domestic cat, a plush fabric applied to the base, a fabric creating scratcher surfaces, at least one scratcher surface being within the interior volume and at least one scratcher surface being on an exterior surface of at least one of the back, front or side walls of the module.

8 Claims, 2 Drawing Sheets

(56) References Cited

U.S. PATENT DOCUMENTS

| | | | | |
|---|---|---|---|---|
| 2009/0320390 | A1* | 12/2009 | Kolozsvari | A01K 1/00 52/202 |
| 2010/0006037 | A1* | 1/2010 | Salzman | A01K 1/033 119/484 |
| 2010/0050953 | A1* | 3/2010 | Fails, Jr. | A01K 15/024 119/706 |
| 2010/0077961 | A1* | 4/2010 | Lipscomb | A01K 15/02 119/28.5 |
| 2010/0147226 | A1* | 6/2010 | Tsengas | A01K 5/0114 119/501 |
| 2010/0154719 | A1* | 6/2010 | Kellogg | A01K 15/024 119/706 |
| 2010/0263601 | A1* | 10/2010 | Quinn | A01K 15/024 119/622 |
| 2011/0239953 | A1* | 10/2011 | Tchekneva | A01K 1/031 119/417 |
| 2013/0032094 | A1* | 2/2013 | Lee | A01K 1/035 119/28.5 |
| 2013/0255586 | A1* | 10/2013 | Gerashchenko | A01K 29/005 119/421 |
| 2014/0230746 | A1* | 8/2014 | Chapman | A01K 1/0254 119/453 |
| 2015/0359194 | A1* | 12/2015 | Coopman | A01K 15/025 119/706 |
| 2016/0057973 | A1* | 3/2016 | Jeglia | A01K 5/00 119/57.8 |

\* cited by examiner

PET ACTIVITY MODULE

TECHNICAL FIELD

The present invention involves a novel pet activity module having certain features which satisfy a plurality of needs recognized as being important to maintain the health and well-being of a domestic cat. Specifically, the present inventive pet activity module can satisfy a cat's need to rest, its need for seclusion and to hunt and scratch without resort to any other typically employed toys, scratchers or furniture items.

BACKGROUND OF THE INVENTION

Domestic pets, particularly cats, have certain needs which, if left unfulfilled, can result in irritability, depression and can even result in more severe physical and emotional problems. For example, cats require a soft and cushioned surface upon which to lounge and relax. To that end, the pet product arena is populated with numerous versions of pet mats, many of which have plush pads and soft cushioning materials to promote sleep and relaxation.

In addition, it is well recognized that domestic cats crave scratching as part of their natural instinctive character. If a dedicated scratching surface is not provided, domestic cats will generally satisfy their need to scratch by turning to furniture, curtains and other articles which may be substantially damaged as a consequence. Often times, pet cats will not only climb over furniture, specifically upholster chairs and sofas, but will use such furniture and carpeting to condition their claws through deliberate and repeated clawing, pulling and tearing actions. As noted, this clawing activity appears to be an irresistible natural impulse for cats and can be the source of great aggravation to the pet owner. As such, it is generally believed that a dedicated scratcher is a necessity for any cat owner.

Cats also require seclusion. Although a domestic cat can be a great source of companionship, there are times when a cat's overall health is promoted by providing an area where the cat can rest and relax, that is, in an area that makes it feel safe. A safe environment encourages the cat to relax without fear of predators. To satisfy this need, pet owners often times purchase furniture having an opening sized to enable a cat to pass through and a hollow interior facilitating rest and relaxation in a nurturing environment.

Finally, cats have the instinctive need to hunt and play and, to satisfy this need, pet owners will provide toys and the like to encourage the cat to swat, play and grab a toy's attractant. Such an attractant need be nothing more than a piece of string or rope with, for example, a feathered bundle which is introduced to the vicinity of the cat or dangled in front of it to promote interest.

As the above discussion clearly suggests, to satisfy all of the cat's inherent needs, the pet owner is required to purchase a plurality of products which can oftentimes prove to be challenging. Many pet owners are forced to dedicate only a limited space for their pets which is not conducive to the inclusion of mats, furniture, scratchers and toys. Furthermore, as each of these items is sold separately, the cumulative cost can represent a financial burden.

It is thus an object of the present invention to provide a pet mat which has the capability, in a single product, of satisfying the cat's need to lounge, scratch, play and hunt as well as providing an area for seclusion.

These and further objects will be more readily apparent when considering the following disclosure and appended claims.

SUMMARY OF THE INVENTION

A pet activity module comprising:
a substantially square or rectangular base for contacting a support surface when in use; substantially parallel back and front walls extending orthogonally from said base; substantially parallel side walls extending orthogonally from said base, said substantially parallel front and back walls being orthogonally joined to said substantially parallel side walls, said base, front, back and side walls together creating an internal volume sized to receive a domestic cat;
a plush fabric applied to said base; and
a fabric creating scratcher surfaces, at least one scratcher surface being within said interior volume and at least one scratcher surface being on an exterior surface of at least one of said back, front or side walls of said module.

DETAILED DESCRIPTION OF THE INVENTION

Figure 1:
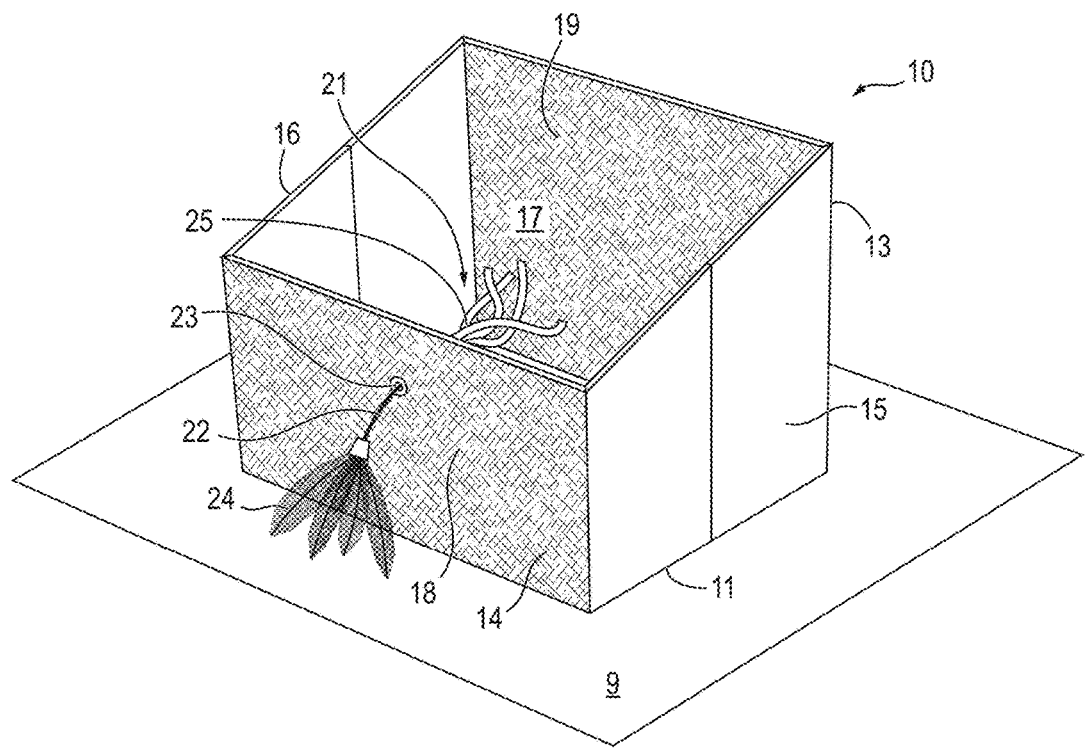
FIG. 1 is a perspective view of the pet activity module of the present invention.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

There has long been a need for a pet activity center which satisfies a cat's requirements to scratch, hunt and play as well as to provide rest and seclusion in a compact easily storable form factor. In this regard, reference is made to FIG. 1 depicting pet activity module 10.

Pet activity module 10 comprises a square or rectangular base 11 for fitting within the front, back and side walls of the module which, in turn resides upon support surface 9 such as the floor of the pet owner's residence. Specifically, pet activity module 10 comprises substantially parallel back wall 13 and front wall 14 extending orthogonally from base 11 and substantially parallel side walls 15 and 16 which together create internal volume 17 sized to receive a typical domestic cat.

Figure 2:
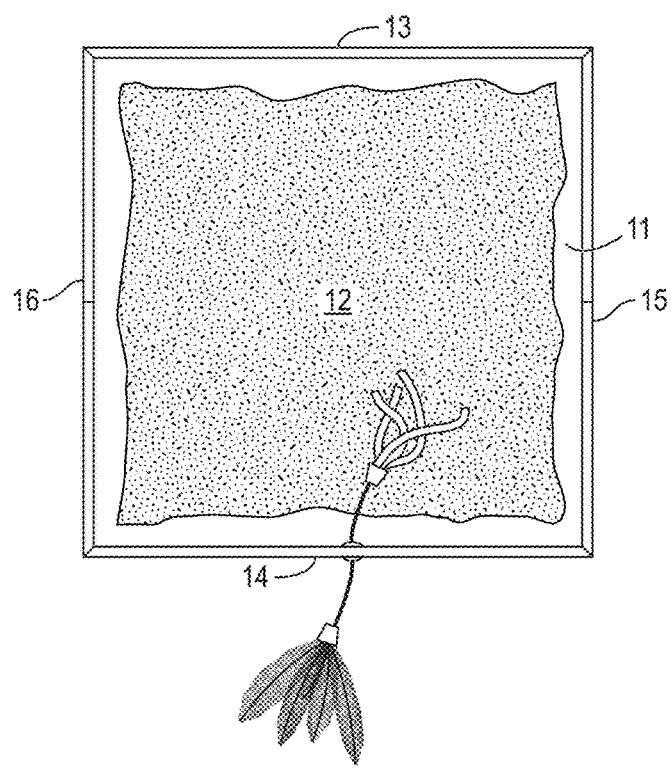
FIG. 2 is a top plan view of the pet activity module of FIG. 1.

Plush fabric 12, such as a faux fur, is applied to base 11 (FIG. 2) and is ideally simply laid upon base 11 and not affixed thereto. By doing so, the cat can snuggle and knead plush fabric 12 providing an additional layer of comfort and relaxation.

The present pet activity module 10 further includes a fabric creating scratcher surfaces and, ideally, at least one scratcher surface being created within interior volume 17 while a second scratcher surface is applied to an exterior surface of at least one of the back, front or side walls of the module. As a preferred embodiment, scratcher surface 18 as applied to the exterior of front wall 14 while scratcher surface 19 is applied to interior surface of back wall 13 thus providing a scratching medium whether the cat resides external to pet activity module 10 or resides within interior volume 17. Burlap would be an ideal fabric for creating the scratching surfaces although other well recognized materials can be employed for this purpose.

As a further preferred embodiment, it is noted in reference to FIG. 1 that back wall 13 is taller than front wall 14 such that essentially parallel side walls 15 and 16 slope downwardly from the back wall 13 to front wall 14. This geometry facilitates and encourages the pet, when facing front wall 14 to hop or climb over it and into interior space 17 as the pet toy, to be described hereinafter as well as plush fabric 12 would be within the sight line of the cat.

To satisfy the cat's need to hunt and play, pet activity module 10 also includes pet toy 21. Ideally, pet toy 21 comprises an umbilical 22 which passes through opening 23 in front wall 14 having attractants 24 and 25 appended to each end thereof. If the cat was to pull upon attractant 24, attractant 25 would move as a consequence thus creating additional stimulation. This would, in all likelihood, entice the cat to hop over front wall 14 and into interior space 17 in order to gain access to attractant 25 and, in doing so, would find itself upon plush fabric 12.

In addition to providing a module which satisfies a cat's need to scratch, play, hunt and rest, the present invention does so in a form of a cube which, when not in use, can be stored in a typical shelf of most standard furniture units and, in doing so is designed to better fit into one's existing home decor and provide a storage solution unimaginable when having to provide a cat with separate scratchers, beds and stimulating toys.

Figure 3:
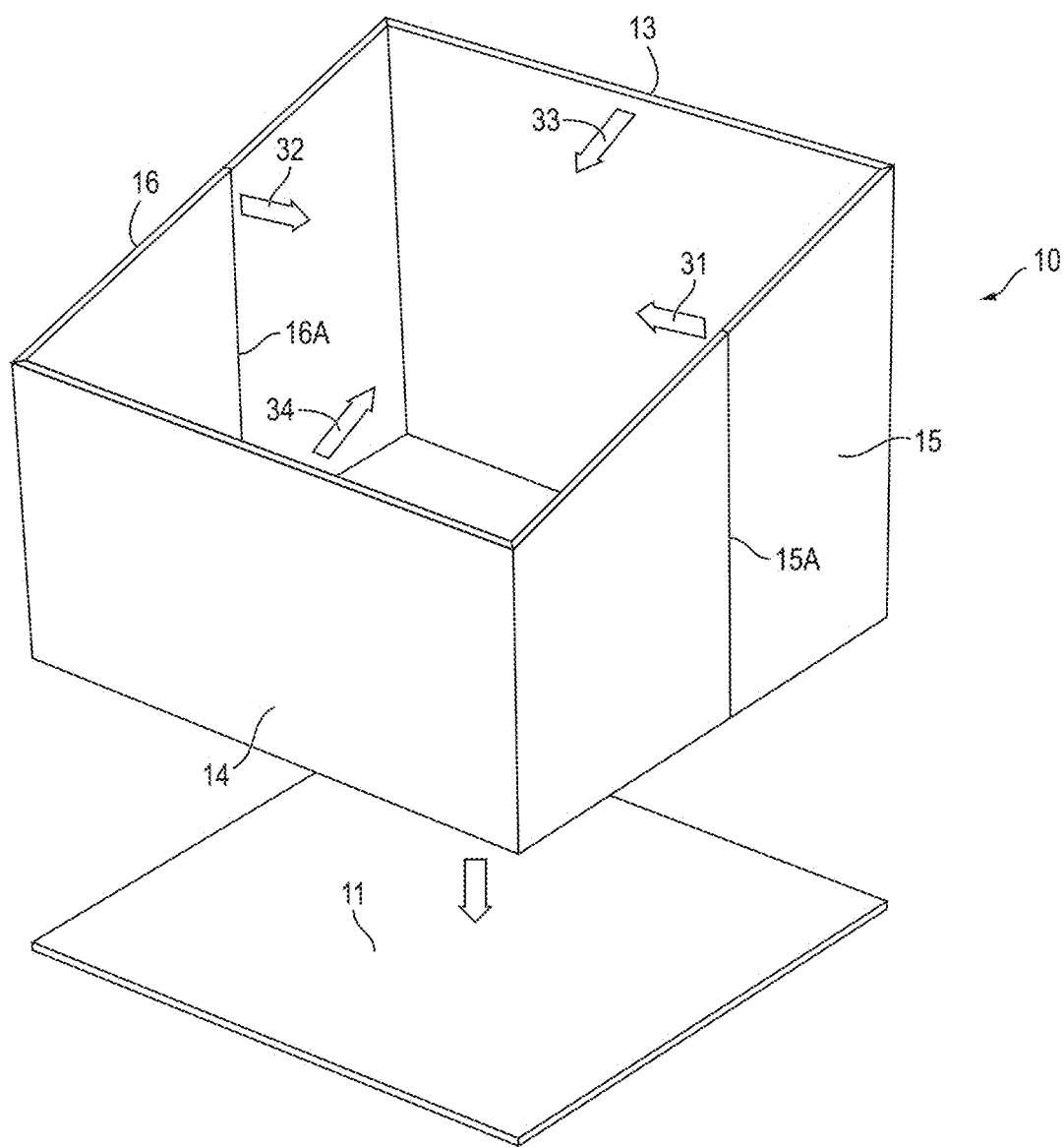
FIG. 3 is a perspective view of the pet activity module the present invention indicating it being folded for storage or shipping.

In order to provide an even more compact form factor for storage and shipping of pet activity module 10, reference is made to FIG. 3. As depicted, base 11 is removable from the front, back and side walls and substantially parallel side walls 15 and 16 are provided with score lines 15A and 16A. Thus, when substantially parallel side walls 15 and 16 are brought together by applying pressure along score lines 15A and 16A in the direction of arrows 31 and 32, back wall 13 and front wall 14 are drawn downwardly by applying pressure in the direction of arrows 33 and 34 again causing pet activity module 10 to assume a substantially flat or two-dimensional form factor. Thus, when not in use, the pet owner can conveniently store pet activity module 10. Retailers can also store and display pet module 10 while occupying minimal space and noting that products of this nature are generally produced offshore, shipping costs can be significantly reduced as compared to those competitive products mentioned previously.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

What is claimed is:

1. A pet activity module comprising:
    a substantially square or rectangular base for contacting a support surface when in use;
    substantially parallel back and front walls extending orthogonally from said base;
    substantially parallel side walls extending orthogonally from said base, said substantially parallel front and back walls being orthogonally joined to said substantially parallel side walls, said base, front, back and side walls together creating an internal volume sized to receive a domestic cat;
    a plush fabric applied to said base; and
    a fabric creating scratcher surfaces, at least one scratcher surface being within said interior volume and at least one scratcher surface being on an exterior surface of at least one of said back, front or side walls of said module.

2. The pet activity module of claim 1 wherein said plush fabric is caused to reside upon said base but is not affixed thereto.

3. The pet activity module of claim 1 wherein said fabric creating said scratcher surfaces comprises burlap.

4. The pet activity module of claim 1 wherein said back wall is taller than said front wall such that said substantially parallel side walls slope downwardly from said back wall to said front wall.

5. The pet activity module of claim 1 further comprising a pet toy.

6. The pet activity module of claim 5 wherein said pet toy comprises an umbilical extending through an opening in said front wall and having an attractant appended to each end thereof such that one such attractant resides outside of said internal volume and one such attractant resides within said internal volume.

7. The pet activity module of claim 1 wherein said fabric creating scratcher surfaces are applied to said front wall on the exterior of said module and on said back wall within said internal volume.

8. The pet activity module claim 1 wherein said base is removable from said back, front and side walls, said back, front and side walls being collapsible for converting said pet activity module to a substantially flat, two-dimensional form factor.

\* \* \* \* \*